Figure 1:
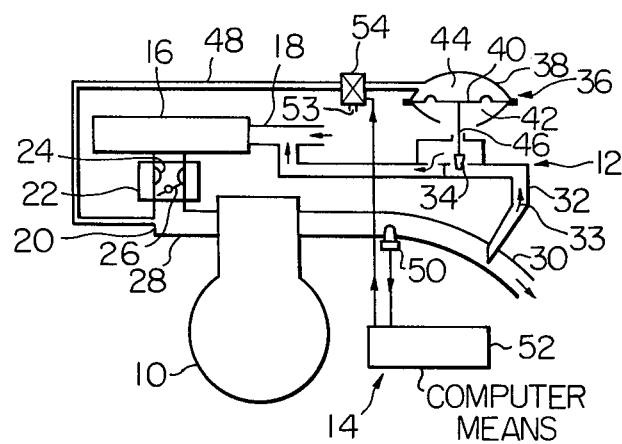

United States Patent [19]
Saito et al.

[11] 3,963,011
[45] June 15, 1976

[54] METHOD AND DEVICE FOR ADJUSTING ENGINE EXHAUST GAS RECIRCULATION CONTROL

[75] Inventors: Masaaki Saito; Hidehiro Minami, both of Yokohama, Japan

[73] Assignee: Nissan Motor Co., Ltd., Yokohama, Japan

[22] Filed: July 25, 1974

[21] Appl. No.: 491,939

[30] Foreign Application Priority Data
July 26, 1973 Japan.............................. 48-84272

[52] U.S. Cl............................................. 123/119 A
[51] Int. Cl.².......................................... F02N 25/06
[58] Field of Search.................... 123/119 A; 60/276

[56] References Cited
UNITED STATES PATENTS

| | | | |
|---|---|---|---|
| 3,768,259 | 10/1973 | Carnahan et al. | 60/276 |
| 3,888,222 | 6/1975 | Tomita | 123/119 A |
| 3,905,773 | 9/1975 | Brooks et al. | 60/276 |
| 3,915,133 | 10/1975 | Nohira | 123/119 A |

*Primary Examiner*—Wendell E. Burns

[57] ABSTRACT

The actual air-fuel ratio of a combustible mixture supplied to an engine is sensed and is compared with a set desired air-fuel ratio which corresponds to a desired ratio of the amount of engine exhaust gases recirculated into the intake system upstream of the carburetor to that of intake air drawn into the engine. An exhaust gas recirculation control valve is operated in dependence on the difference between the actual and desired air-fuel ratios to change the flow of exhaust gases to control the actual ratio of the amount of exhaust gases recirculated into the intake system to that of engine intake air to the desired ratio.

6 Claims, 2 Drawing Figures

U.S. Patent  June 15, 1976  3,963,011

METHOD AND DEVICE FOR ADJUSTING ENGINE EXHAUST GAS RECIRCULATION CONTROL

The present invention relates generally to control of the flow of exhaust gases recirculated into the intake system of an internal combustion engine and particularly to a method of automatically adjusting an actual flow of recirculated exhaust gases to a predetermined desired flow and a device for accomplishing the method.

Internal combustion engines have been recently equipped with exhaust gas recirculation systems to recirculate at least a portion of engine exhaust gases into the intake system such as into an air cleaner as an inert gas for controlling the temperature of combustion of a combustible mixture in an engine combustion chamber. This is to reduce the production of noxious nitrogen oxides ($NO_x$) which pollute the atmosphere. Such an exhaust gas recirculation system employs as a parameter of the flow of intake air drawn into the engine: the intake manifold vacuum, engine speed, exhaust gas pressure or the carburettor venturi vacuum and is constructed and arranged to allow into the intake system exhaust gases the amount of which is controlled to a predetermined or desired ratio to that of intake air drawn into the engine. Although such an exhaust gas recirculation system is usually effective to accomplish control of such a predetermined or desired exhaust gas recirculation at the initial stage of use thereof, it fails to effect control of the predetermined or desired exhaust gas recirculation with duration of use thereof because of trouble of the recirculation system such as deposition of solid particles in exhaust gases on a metering valve and a valve seat or corrosion thereof by acid ingredients in the exhaust gases. Thus, the amount of recirculated exhaust gases is undesirably increased or reduced relative to that of engine intake air to cause deterioration in engine performance or increase in the formation of noxious nitrogen oxides. In this instance, a conventional exhaust gas recirculation system has been repaired or adjusted to restore the desired or initially predetermined recirculation control by a manual operation as by changing the degree of opening of the metering valve or removing particle deposits thereon and on the valve seat.

It is, therefore, an object of the invention to provide a method of, when an exhaust gas recirculation control valve fails to effect a predetermined desired exhaust gas recirculation control, automatically restoring the same and a device for accomplishing the method.

Figure 2:
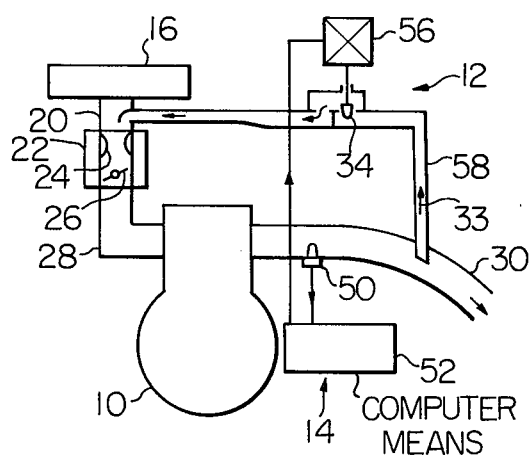

This and other objects and advantages of the invention will become more apparent from the following detailed description taken in connection with the accompanying drawings in which:

FIG. 1 is a schematic view, partly in longitudinal section, showing a first preferred embodiment of an exhaust gas recirculation control adjusting device according to the invention; and FIG. 2 is a schematic view, partly in longitudinal section, showing a second preferred embodiment of an exhaust gas recirculation control adjusting device according to the invention.

Where engine exhaust gases are recirculated into an intake system such as into an air cleaner or an intake conduit at a location upstream of a carburettor, the air-fuel ratio of an air fuel mixture drawn into an engine varies in accordance with change in the ratio of the amount of recirculated exhaust gases to that of intake air drawn into the engine. The relationship between these two ratios will be described in detail in the following.

The rate of flow of fuel fed from the carburettor into the engine is proportional to that of flow of fluid or gas passing through the venturi section of the carburettor. When no exhaust gases are recirculated into the intake system, the air-fuel ratio MR of an air fuel mixture drawn into the engine is expressed as $$MR = \frac{Ga}{Gf}$$

where $Ga$ is the rate of flow of intake air drawn into the engine and $Gf$ is the rate of flow of fuel drawn into the engine. When exhaust gases are recirculated into the intake system with the degree of opening of a throttle valve being the same as when no exhaust gases are recirculated, the sum of the flow gate $Ga'$ of engine intake air and the flow rate $Ge$ of recirculated exhaust gases is equal to $Ga$, that is, $$Ga = Ga' + Ge$$

Accordingly, the flow rate of fuel drawn into the engine is unvaried at $Gf$. In this instance, the air-fuel ratio $MR'$ of an air fuel mixture drawn into the engine is expressed as $$MR' = \frac{Ga'}{Gf}$$

The ratio R of the flow rate of recirculated exhaust gases to that of intake air drawn in the engine is expressed as $$R = \frac{Ge}{Ga'}$$

Combining the above-mentioned four equations gives $$MR' = \frac{MR}{1 + R} \qquad (1)$$

From the equation (1) it is apparent that as the ratio R is increased or reduced, the air-fuel ratio $MR'$ is reduced or increased so that the air-fuel mixture becomes richer or leaner, respectively.

An exhaust gas recirculation control adjusting device according to the invention utilizes the relationship between the air-fuel ratio $MR'$ and the ratio R, as will be described in detail hereinafter.

FIG. 1 illustrates a first preferred embodiment of the invention. Referring now to FIG. 1, there is shown an internal combustion engine 10, an exhaust gas recirculation control system 12 and an exhaust gas recirculation control adjusting device 14 according to the invention which are combined with each other. The engine 10 is provided with an intake system including an air cleaner 16 vented to the outside atmosphere through an air inlet pipe 18, a combustible mixture intake conduit 20 leading from the air cleaner 16 to an engine combustion chamber (not shown) through a carburettor 22 which has a venturi section 24 formed therein and a throttle valve 26 rotatably mounted therein, and an intake manifold 28 constituting part of the intake conduit 20, and an exhaust conduit 30 leading from the engine combustion chamber to the outside atmosphere. The exhaust gas recirculation control system 12 includes an exhaust gas recirculation conduit 32 interconnecting the air inlet pipe 18 and the exhaust conduit 30 to recirculate at least a portion of engine exhaust gases into the air inlet pipe 18 from the exhaust conduit 30. Recirculated exhaust gases flow in the direction of the arrow 33 in the conduit 32. An exhaust gas recirculation control valve 34 is operably disposed in the condiut 32 to control or meter the flow of exhaust gases recirculated into the air inlet pipe 18 through the conduit 32. A vacuum responsive diaphragm assembly 36 is provided outside the conduit 32 to operate the exhaust gas recirculation control valve 34. The assembly 36 has a casing 38, a flexible diaphragm 40 deformably disposed in the casing 38 and dividing the interior of the casing 38 into atmospheric and vacuum chambers 42 and 44, and a plunger 46 operatively connected at one end to the control valve 34 and at the other end to the center of the diaphragm 40. The atmospheric chamber 42 is vented to the outside atmosphere through apertures (not shown) formed in the wall of the casing 38. The vacuum chamber 44 communicates with the intake manifold 28 by way of a conduit 48. The diaphragm 40 is movable upwardly and downwardly in the drawing in response to increases and reductions in the vacuum in the intake manifold 28. The control valve 34 is operated in accordance with upward and downward movements of the diaphragm 40 to increase and reduce the degree of opening of the valve 34 and accordingly the flow of exhaust gases recirculated into the air inlet pipe 18. Thus, the valve 34 is operable to control the flow of exhaust gases recirculated into the intake system at a predetermined or desired ratio to that of intake air drawn into the engine.

The exhaust gas recirculation control adjusting device 14 comprises an air-fuel ratio sensing means 50 such as an oxygen sensor disposed in the exhaust conduit 30 to sense, for example, the oxygen content in engine exhaust gases thereby sensing the value or magnitude of the actual air-fuel ratio of a combustible mixture supplied to the engine and burned therein. Computer means 52 such as an electronic computer is connected to the air-fuel ratio sensing means 50 and stores in its memory a desired or set air-fuel ratio which corresponds to a desired optimum value of the ratio of the amount of exhaust gases recirculated into the intake system to that of engine intake air. The computer means 52 receives the value of the actual air-fuel ratio sensed by the sensing means 50 and compares the value of the sensed actual air-fuel ratio with the value of the desired air-fuel ratio. The conduit 48 is communicable with the atmosphere through a vent port 53. A valve 54 such as a vent valve or an electromagnetically operated three-way valve is provided to control communication between the conduit 48 and the atmosphere to control the introduction of outside air into the vacuum chamber 44. The valve 54 may be hydraulically, pneumatically, mechanically or electrically connected to the computer means for operation thereby in this manner. The computer means 52 controls the degree of opening of the valve 54 in dependence on the difference between the values of the desired and actual air-fuel ratios to control the amount of outside air introduced into the conduit 48. In accordance with the amount of outside air introduced into the conduit 48, the vacuum in the vacuum chamber 44 and accordingly the degree of opening of the control valve 34 are modulated.

The operation of the exhaust gas recirculation control adjusting device 14 of FIG. 1 is as follows.

The value of the actual air-fuel ratio of a combustible mixture supplied to the engine combustion chamber and burned therein is sensed by the air-fuel ratio sensing means 50 and is transmitted to the computer means 52 and is compared with the value of the desired or set air-fuel ratio, when the value of the actual air-fuel ratio is higher or lower than that of the desired air-fuel ratio, the computer means 52 operates the valve 54 to reduce or increase the degree of opening of the valve 54 or close or open, respectively, the same in dependence on the difference between the values of the actual and desired air-fuel ratios. As a result, the vacuum in the vacuum chamber 44 is increased or reduced to operate the exhaust gas recirculation control valve 34 to increase or reduce, respectively, the degree of opening thereof. Thus, the exhaust gas recirculation control adjusting device 14 increases or reduces the ratio of the flow rate of recirculated exhaust gases to that of engine intake air to the set or desired optimum value. At the same time, the actual air-fuel ratio of a combustible mixture supplied to the engine combustion chamber reaches the desired or set air-fuel ratio.

FIG. 2 illustrates a second preferred embodiment of the invention. The embodiment of FIG. 2 is different from the embodiment of FIG. 1 in that a servo actuator 56 which is not operated by the vacuum in the intake manifold 28 is employed in lieu of the vacuum operated diaphragm assemby 36 as means for operating the flow control valve 34, accordingly the conduit 48 and valve 54 are not provided, and an exhaust gas recirculation conduit 58 communicates with the intake conduit 20 at a location between the air cleaner 16 and carburettor 22. In FIG. 2, like component elements are designated by the same reference nuerals as those used in FIG. 1. The servo actuator 56 is connected to the computer means 52 for control thereby. When a difference exists between the values of the actual and desired air-fuel ratios, the servo actuator 56 is operated by the computer means 52 to control the degree of opening of the flow control valve 34 to control the ratio of the flow rate of exhaust gases recirculated into the intake system to that of engine intake air to the set or desired optimum value.

It will be understood that since an exhaust gas recirculation control adjusting device according to the invention can control the air-fuel ratio of a combustible mixture as well as the ratio of the amount of exhaust gases recirculated into the intake system to that of engine intake air, the air-fuel ratio of a combustible mixture is maintained constant even when the air-fuel ratio of the combustible mixture is varied with atmospheric pressure and temperature, humidity, etc., by employing the exhaust gas recirculation control adjusting device and accordingly the adjusting device is effective even if it is sued together with a catalytic converter for purifying engine exhaust gases.

It will be also understood that an exhaust gas recirculation control adjusting device according to the invention, even if the characteristics of a carburettor is varied, can control the ratio of the amount of exhaust gases recirculated into the intake system to that of engine intake air to an optional desired value corresponding to the varied characteristics of the carburettor by changing a desired or set air-fuel ratio to a different desired value.

What is claimed is:

1. A method of maintaining the flow rate of engine exhaust gas recirculated into an intake system of an internal combustion engine at a desired ratio to the flow rate of air drawn into said engine, comprising the steps of sensing the actual air-fuel ratio of a combustible mixture supplied to an internal combustion engine, comparing said sensed actual air-fuel ratio with a desired air-fuel ratio which corresponds to a desired ratio of the flow rate of engine exhaust gas recirculated into an intake system of said engine to the flow rate of air drawn into said engine, and adjusting the flow of said engine exhaust gas in accordance with the difference between said sensed actual air-fuel ratio and said desired air-fuel ratio to adjust the flow rate of said engine exhaust gas to said desired ratio to the flow rate of said air concurrently adjust the air-fuel ratio of said combustible mixture to said desired air-fuel ratio.

2. A method as claimed in claim 1, in which said actual air-fuel ratio is sensed by sensing the content of oxygen in exhaust gas from said engine.

3. A combination of an exhaust gas recirculation system in an internal combustion engine with a device for maintaining the flow rate of engine exhaust gas recirculated into an intake system of said engine at a desired ratio to the flow rate of air drawn into said engine, said exhaust gas recirculation system having an exhaust gas recirculation control valve and control means for controlling said exhaust gas recirculation control valve, said device comprising a sensor for sensing the actual air-fuel ratio of a combustible mixture supplied to said engine, and computer means for comparing said sensed actual air-fuel ratio with a desired air-fuel ratio which corresponds to a desired ratio of the flow rate of said engine exhaust gas to the flow rate of said air, said computer means adjusting said control means in accordance with the difference between said sensed actual air-fuel ratio and said desired air-fuel ratio to adjust the degree of opening of said exhaust gas recirculation control valve to adjust the flow rate of said engine exhaust gas to said desired ratio to the flow rate of said air and concurrently adjust the air-fuel ratio of said combustible mixture to said desired air-fuel ratio.

4. A combination as claimed in claim 3, in which said sensor comprises an oxygen sensor located in an exhaust gas conduit of said engine and sensing the content of oxygen in engine exhaust gas to sensed said actual air-fuel ratio of said combustible mixture.

5. A combination as claimed in claim 3, in which said control means comprises a vacuum operated diaphragm unit having a vacuum chamber communicating with an intake manifold of said engine, a conduit interconnecting said intake manifold and said vacuum chamber and communicable with the outside atmosphere, and in which said device further comprises a vent valve for controlling communication between said conduit and the outside atmosphere, said computer means operating said vent valve in accordance with the difference between said sensed actual air-fuel ratio and said desired air-fuel ratio to control the introduction of air into said conduit to adjust the vacuum in said vacuum chamber.

6. A combination comprising an exhaust gas recirculation control system in an internal combustion engine which system has an exhaust gas recirculation control valve and means for operating said exhaust gas recirculation control valve, and a device for controlling the actual air-fuel ratio of a combustible mixture supplied to said engine, said device comprising an air-fuel ratio sensing means for sensing the actual air-fuel ratio of a combustible mixture supplied to said engine, computer means for comparing said actual air-fuel ratio sensed by said sensing means with a predetermined air-fuel ratio, said computer means modulating said means for operating said exhaust gas recirculation control valve when a difference exists between said actual and predetermined air-fuel ratios to modulate the degree of opening of said exhaust gas recirculation control valve, in which said means for operating said exhaust gas recirculation control valve comprises a servo actuator connected to said computer means for control thereby, said computer means modulating said servo actuator when a difference exists between said actual and predetermined air-fuel ratios to modulate the degree of opening of said exhaust gas recirculation control valve.

* * * * *